United States Patent
Tsuchida et al.

(10) Patent No.: US 9,230,718 B2
(45) Date of Patent: Jan. 5, 2016

(54) CHIP THERMISTOR

(71) Applicant: TDK CORPORATION, Tokyo (JP)

(72) Inventors: Daisuke Tsuchida, Tokyo (JP); Yo Saito, Tokyo (JP); Kouki Yamada, Tokyo (JP)

(73) Assignee: TDK CORPORATION, Tokyo (JP)

( * ) Notice: Subject to any disclaimer, the term of this patent is extended or adjusted under 35 U.S.C. 154(b) by 171 days.

(21) Appl. No.: 14/061,238

(22) Filed: Oct. 23, 2013

(65) Prior Publication Data

US 2014/0125448 A1 May 8, 2014

(30) Foreign Application Priority Data

Nov. 6, 2012 (JP) .................... 2012-244643

(51) Int. Cl.

| | |
|---|---|
| *H01C 7/10* | (2006.01) |
| *H01C 7/00* | (2006.01) |
| *H01C 1/148* | (2006.01) |
| *H01C 17/28* | (2006.01) |
| *H01C 17/00* | (2006.01) |
| *H01G 4/232* | (2006.01) |

(52) U.S. Cl.
CPC ............... *H01C 7/008* (2013.01); *H01C 1/148* (2013.01); *H01C 17/283* (2013.01); *H01C 17/006* (2013.01); *H01G 4/2325* (2013.01)

(58) Field of Classification Search
CPC ...... H01C 1/148; H01C 7/008; H01C 17/283; H01C 17/006
USPC ........................................... 338/22 R
See application file for complete search history.

(56) References Cited

U.S. PATENT DOCUMENTS

| | | | | |
|---|---|---|---|---|
| 5,111,179 | A | * | 5/1992 | Flassayer et al. ............. 338/313 |
| 5,339,068 | A | * | 8/1994 | Tsunoda et al. ............. 338/332 |
| 5,534,843 | A | * | 7/1996 | Tsunoda et al. ............. 338/22 R |
| 5,866,196 | A | * | 2/1999 | Ueno et al. ...................... 427/79 |
| 6,232,867 | B1 | * | 5/2001 | Yoshida et al. ................. 338/21 |
| 6,400,253 | B1 | * | 6/2002 | Jinno et al. ..................... 338/332 |
| 6,535,105 | B2 | * | 3/2003 | Heistand et al. .............. 338/226 |
| 8,154,379 | B2 | * | 4/2012 | Theissl et al. .............. 338/22 R |
| 2002/0109575 | A1 | * | 8/2002 | Jeong et al. ..................... 338/21 |
| 2010/0001828 | A1 | * | 1/2010 | Mihara et al. ............. 338/22 SD |

FOREIGN PATENT DOCUMENTS

JP A-06-140278 5/1994

\* cited by examiner

*Primary Examiner* — Kyung Lee
(74) *Attorney, Agent, or Firm* — Oliff PLC

(57) ABSTRACT

A chip thermistor includes a thermistor element body and a pair of outer electrodes. The thermistor element body has a pair of end faces opposing each other and a main face connecting the end faces to each other. The pair of outer electrodes are arranged on the pair of end faces, respectively. The pair of outer electrodes have a width in a direction intersecting the opposing direction of the pair of end faces made narrower with distance from the thermistor element body.

4 Claims, 5 Drawing Sheets

(a)

(b)

(c)

(d)

(e)

CHIP THERMISTOR

BACKGROUND OF THE INVENTION

1. Field of the Invention

The present invention relates to a chip thermistor.

2. Related Background Art

Patent Literature 1 (Japanese Patent Application Laid-Open No. H06-140278) discloses a chip-shaped multilayer capacitor comprising an element body having a plurality of inner electrodes arranged therewithin and a pair of outer electrodes arranged at both ends of the element body. The element body exhibits a rectangular parallelepiped form having a pair of main faces opposing each other, a pair of side faces opposing each other and adjoining the main faces, and a pair of end faces opposing each other and adjoining the main faces and the side faces. The outer electrodes totally cover their corresponding end faces and extend therefrom to go around the main faces and side faces. Therefore, in a direction intersecting the direction in which the pair of end faces oppose each other, each of the outer electrodes has a width greater than that of the element body.

SUMMARY OF THE INVENTION

However, the following problems have occurred when the structure of outer electrodes in the multilayer capacitor disclosed in Patent Literature 1 is to be employed in a chip thermistor.

A chip thermistor measures temperature by utilizing a change in resistance value of a thermistor element body with respect to a change in temperature. This makes it very important to perform quality control such that the resistance value fluctuates less depending on individuals. However, the following problems may occur when the structure of outer electrodes in the multilayer capacitor disclosed in Patent Literature 1 is employed in the chip thermistor. When soldering the chip thermistor to an electrode on a circuit board, solder may go around an outer electrode and adhere to the thermistor element body. As a result, even when the resistance value of the chip thermistor as an individual is kept under control at a desirable value, the resistance value of the chip thermistor in a state mounted on the circuit board may deviate from the desirable value.

In general, outer electrodes are wider than thermistor element bodies. Therefore, when the structure of outer electrodes in the multilayer capacitor disclosed in Patent Literature 1 is employed in a chip thermistor, the thermistor element body and a circuit board on which the chip thermistor is mounted separate from each other. This distances the thermistor element body from the circuit board whose temperature is to be measured. Hence, the temperature determined by the chip thermistor may fail to accurately represent the temperature of the subject to be measured.

It is therefore an object of the present invention to provide a thermistor which is hard to change its characteristics even after being mounted to a subject whose temperature is to be measured and can measure the temperature of the subject more accurately.

The thermistor in accordance with one aspect of the present invention comprises a thermistor element body having a pair of end faces opposing each other and a main face connecting the end faces to each other and a pair of outer electrodes arranged respectively on the pair of end faces; wherein the pair of outer electrodes have a width in a direction intersecting the opposing direction of the pair of end faces made narrower with distance from the thermistor element body.

In the thermistor in accordance with one aspect of the present invention, the width of the outer electrodes in a direction intersecting the opposing direction of the pair of end faces is made narrower with distance from the thermistor element body. Therefore, when the chip thermistor is mounted on a subject to be measured (e.g., a circuit board) such that a main face opposes the subject, the subject and the main face (thermistor element body) come very close to each other. Hence, when soldering an electrode of the subject and an outer electrode of the chip thermistor to each other, solder is less likely to go around to the main face (thermistor element body). As a result, the distance between the outer electrodes is hard to change substantially, whereby the chip thermistor is less likely to change its characteristics even after being mounted to the subject to be measured. In addition, the subject to be measured and the main face (thermistor element body) come very close to each other, so that the temperature of the subject can be measured more accurately.

Each of the pair of outer electrodes may have a foundation electrode layer arranged on the end face and a plating film covering the foundation electrode layer, wherein the foundation electrode layer has a width in the direction intersecting the opposing direction not greater than that of the thermistor element body and made narrower with distance from the thermistor element body.

The foundation electrode layer may be porous. In this case, the foundation electrode layer has a rough surface, so that the plating film arranged on the foundation electrode layer is easier to adhere thereto firmly. Hence, heat is conducted efficiently between the foundation electrode layer and the plating film. This can improve the accuracy in temperature measurement by the chip thermistor.

The foundation electrode layer may have a porosity of 10% to 80%. When the porosity of the foundation electrode layer is less than 10%, burrs tend to occur from the foundation electrode layer in a process of dividing a planar chip thermistor precursor into chips with a dicing blade. When the porosity of the foundation electrode layer exceeds 80%, the thermal conduction efficiency in the foundation electrode layer becomes lower, whereby the accuracy in temperature measurement by the chip thermistor tends to decrease. The strength of the foundation electrode layer also tends to lower.

The present invention can provide a thermistor which is hard to change its characteristics even after being mounted to a subject whose temperature is to be measured and can measure the temperature of the subject more accurately.

The present invention will be more fully understood from the detailed description given herein below and the accompanying drawings, which are given by way of illustration only, and thus are not to be considered as limiting the present invention.

DESCRIPTION OF THE PREFERRED EMBODIMENTS

Embodiments of the present invention, which are illustrative but not limitative of the present invention, will be explained with reference to the drawings. In the explanation, the same constituents or those having the same functions will be referred to with the same signs while omitting their overlapping descriptions.

Figure 1:
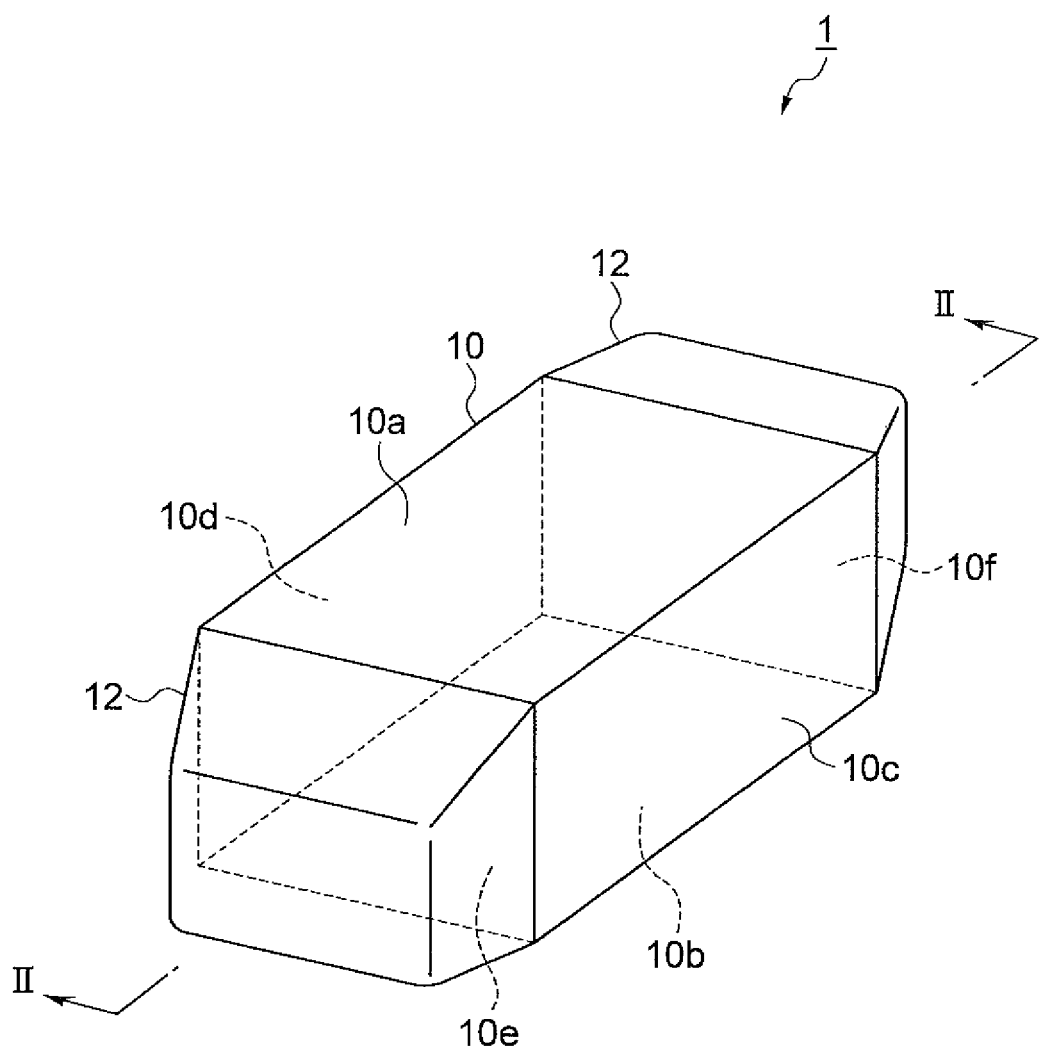
FIG. 1 is a perspective view illustrating a chip thermistor in accordance with an embodiment of the present invention.
Figure 2:
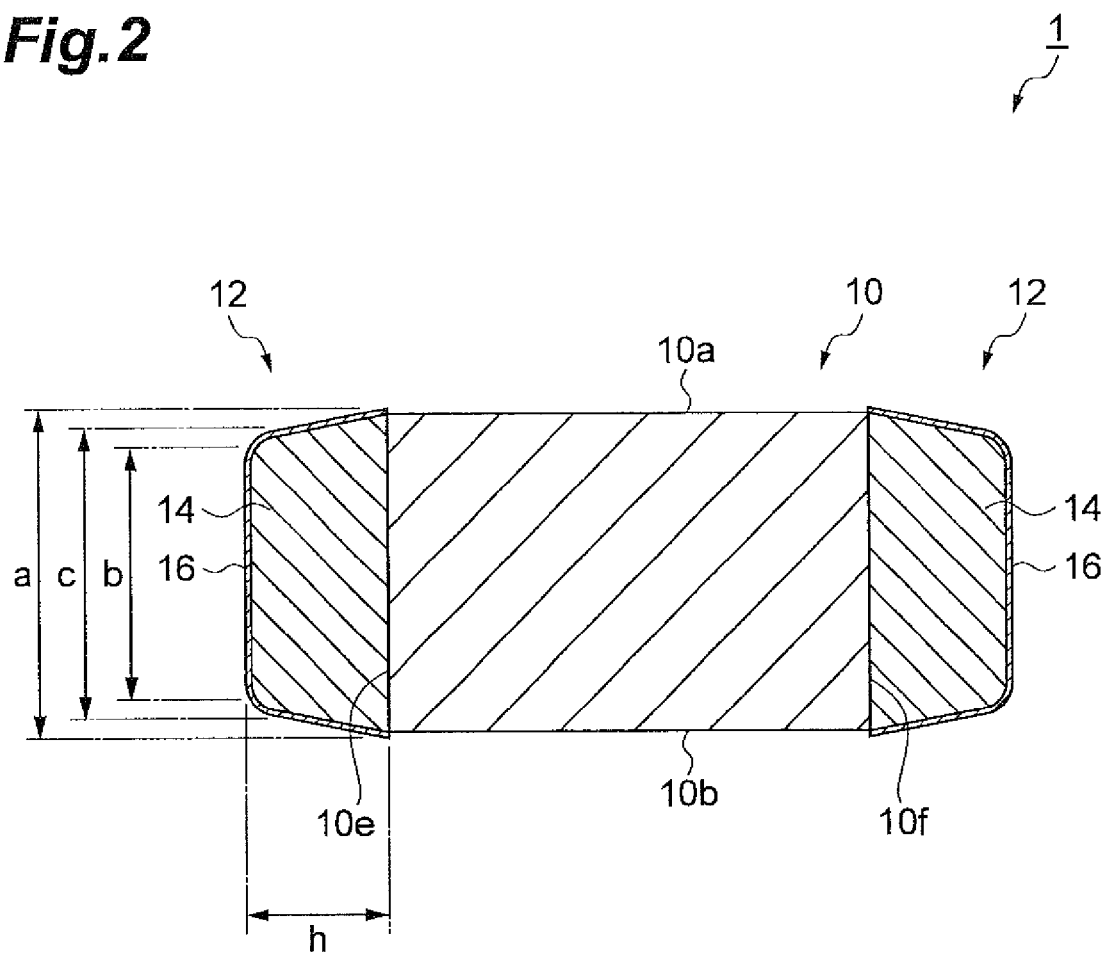
FIG. 2 is a sectional view taken along the line II-II of FIG. 1.

First, with reference to FIGS. 1 to 3, the structure of a chip thermistor 1 will be explained. As illustrated in FIGS. 1 and 2, the chip thermistor 1 comprises a thermistor element body 10 having a substantially rectangular parallelepiped form and a pair of outer electrodes 12. The chip thermistor 1 has a longitudinal length of about 0.4 mm, a width of about 0.2 mm, and a height of about 0.2 mm (i.e., so-called 0402 size), for example. The chip thermistor 1 may be either an NTC (Negative Temperature Coefficient) thermistor or a PTC (Positive Temperature Coefficient) thermistor.

The thermistor element body 10 has main faces 10a, 10b opposing each other, side faces 10c, 10d opposing each other, and end faces 10e, 10f opposing each other. The main face 10a or 10b becomes a mount surface opposing a circuit surface of a circuit board (not depicted) in this embodiment. The main faces 10a, 10b adjoin the side faces 10c, 10d and the end faces 10e, 10f. The side faces 10c, 10d adjoin the main faces 10a, 10b and the end faces 10e, 10f. The thermistor element body 10 has a longitudinal length of about 0.4 mm, a width of about 0.2 mm, and a height of about 0.2 mm (i.e., so-called 0402 size), for example.

For example, the thermistor element body 10 is constituted by a ceramic containing metal oxides of Mn, Ni, and Co as main components. In addition to the metal oxides of Mn, Ni, and Co, the thermistor element body 10 may contain Fe, Cu, Al, Zr, and the like as accessory components for adjusting its characteristics. The thermistor element body 10 may also be constituted by metal oxides of Mn and Ni or those of Mn and Co instead of those of Mn, Ni, and Co.

The pair of outer electrodes 12 are arranged on the end faces 10e, 10f, respectively. Each outer electrode 12 has a foundation electrode layer 14 and a plating film 16. As illustrated in FIGS. 1 and 2, the width of the foundation electrode layer 14 in a direction intersecting the opposing direction of the end faces 10e, 10f is made narrower with distance from the thermistor element body 10. That is, the foundation electrode layer 14 is formed into a truncated quadrangular pyramid. In this embodiment, the area by which the foundation electrode layer 14 is in contact with the thermistor element body 10 is equal to that of each of the end faces 10e, 10f. Ridges and corners of the foundation electrode layer 14 are barrel-polished into curved surfaces.

The height h (the width in the opposing direction of the end faces 10e, 10f) of the foundation electrode layer 14 is set to about 70 to 170 µm, for example. The longer-side width a (in the opposing direction of the main faces 10a, 10b or side faces 10c, 10d) of the foundation electrode layer 14 is set to about 195 to 205 µm, for example. The shorter-side width b (in the opposing direction of the main faces 10a, 10b or side faces 10c, 10d) of the foundation electrode layer 14 is set smaller than the width c (in the opposing direction of the main faces 10a, 10b or side faces 10c, 10d) of the foundation electrode layer 14 at a position where the height of the foundation electrode layer 14 is h/2. The width c, which is smaller than the width a, is set to 190 to 200 for example. The difference (a−c) between the widths a and c is set to about 2 to 5 µm, for example, while the ratio (c/a) of the width c to the width a is set to about 98% to 99%, for example.

Figure 3:
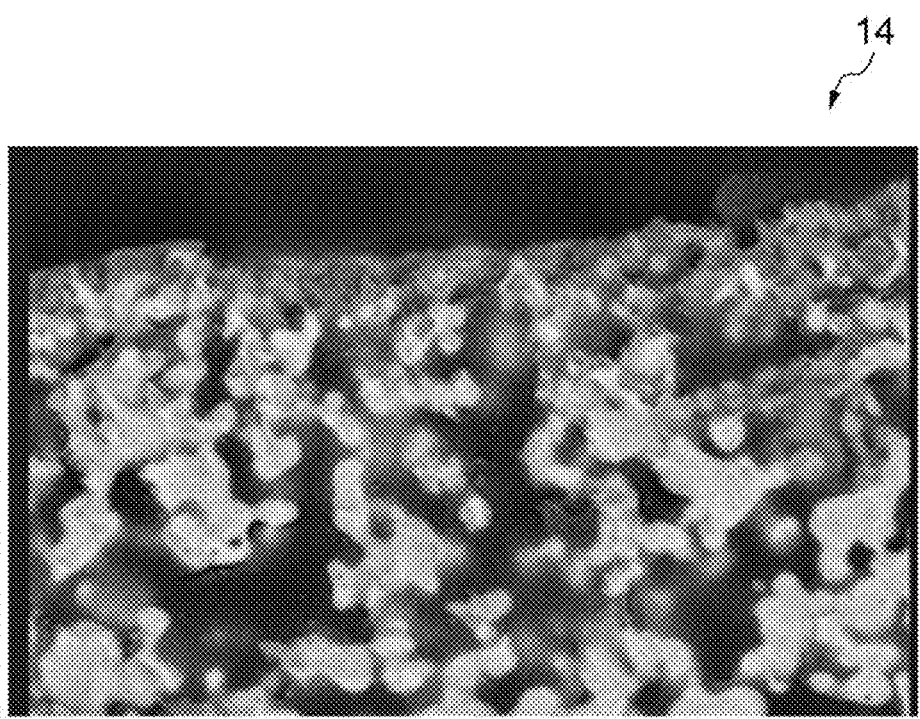
FIG. 3 is an electron micrograph illustrating a cross section of a foundation electrode layer under magnification.

As illustrated in FIG. 3, the foundation electrode layer 14 is porous. The porosity of the foundation electrode layer 14 is set to about 10% to 80%, for example. When the porosity of the foundation electrode layer 14 is less than 10%, burrs tend to occur from the foundation electrode layer 14 in a process of dividing a planar chip thermistor precursor 108 of the chip thermistor 1 into chips with a dicing blade DB (which will be explained later in detail). When the porosity of the foundation electrode layer 14 exceeds 80%, the thermal conduction efficiency in the foundation electrode layer 14 becomes lower, whereby the accuracy in temperature measurement by the chip thermistor 1 tends to decrease. The strength of the foundation electrode layer 14 also tends to lower in this case. The porosity of the foundation electrode layer 14 is preferably set to about 30% to 50%, more preferably about 35% to 45%. When the porosity of the foundation electrode layer 14 is about 35% to 45%, the balance between the thermal conduction efficiency of the foundation electrode layer 14 and its strength becomes favorable. The porosity of the foundation electrode layer 14 can be determined by analyzing an image of an electron micrograph of a cross section of the foundation electrode layer 14 (e.g., a photograph taken through a scanning electron microscope (SEM) at a magnification of about 1000×).

Examples of materials for the foundation electrode layer 14 include Ag, Ag—Pd, Ni, and Cu. The foundation electrode layer 14 may further contain a glass fit as an accessory component.

The plating film 16 is arranged on the foundation electrode layer 14 so as to cover the whole surface of the latter. For example, the plating film 16 has a first layer made of a material such as Ni having solder corrosion resistance and a second layer made of a material such as Su, an Su alloy, Ag, or the like having solder wettability. The first layer has a thickness set to about 0.5 to 5 µm, for example. The second layer has a thickness set to about 1 to 7 µm, for example.

Figure 4:
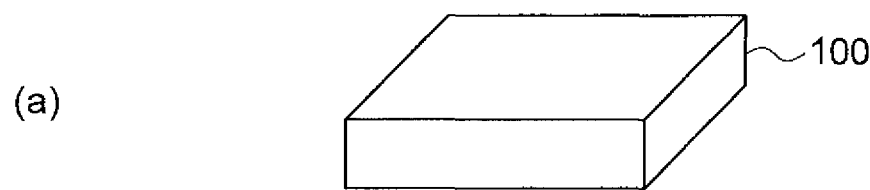
FIGS. 4(a) to 4(e) are a set of diagrams for explaining steps of manufacturing the chip thermistor in accordance with the embodiment of the present invention.
Figure 4:
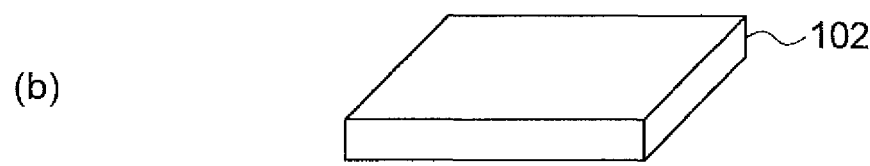
Figure 4:
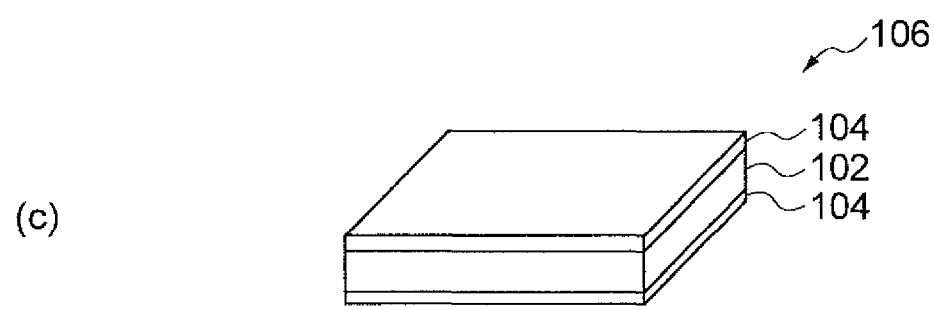
Figure 4:
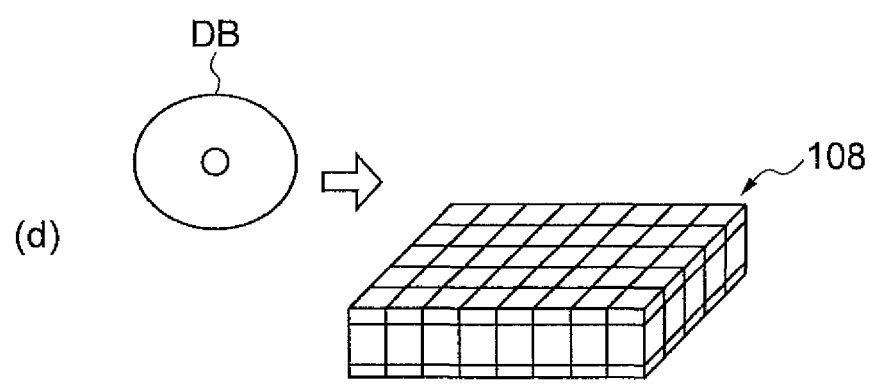
Figure 4:

A method of manufacturing the chip thermistor 1 will now be explained with reference to FIG. 4. First, by a known method, metal oxides of Mn, Ni, and Co which are main components of the thermistor element body 10 and Fe, Cu, Al, Zr, or the like which is an accessory component are mixed at predetermined ratios, so as to prepare a thermistor material. An organic binder and the like are added to the thermistor material, so as to yield a slurry.

Next, thus produced slurry is applied onto a film so as to have a predetermined thickness, thereby making a green sheet corresponding to the thermistor element body 10. A predetermined number of such green sheets are stacked and bonded under a predetermined pressure, so as to yield a green multilayer body. Subsequently, the green multilayer body is heated for 0.5 to 48 hr at a temperature on the order of 180° C. to 400° C., for example, so as to be debindered. Then, the green multilayer body is fired for about 12 to 48 hr in an air or oxygen atmosphere at a temperature of about 800° C. or higher. This produces a substrate 100 for the thermistor element body 10 (see (a) of FIG. 4). The firing integrates the green sheets to such an extent that their boundaries are indiscernible. Thereafter, the main faces of the substrate 10 are polished to a desirable thickness, whereby a substrate 102 having an adjusted thickness is obtained (see (b) of FIG. 4).

Next, a metal powder mainly composed of Ag, Ag—Pd, Ni, or Cu, doped with a glass frit as an accessory component when necessary, is mixed with an organic binder and an organic solvent, so as to prepare a conductive paste. The conductive paste is applied by printing onto one main face of the substrate 102 so as to have a predetermined thickness. Then, the applied conductive paste is heated for about 0.5 to 2 hr at a temperature on the order of 600° C. to 900° C., so as to be sintered. The process from applying the conductive paste to sintering thereof is repeated a plurality of times, so as to form a foundation electrode layer 104 having a desirable thickness on one main face of the substrate 102. Similarly, a foundation electrode layer 104 having a desirable thickness is formed on the other main face of the substrate 102 (see (c) of FIG. 4). This produces a planar precursor 106 of the chip thermistor 1. The foundation electrode layers 104 are porous.

Next, the planar precursor 106 of the chip thermistor 1 is cut (diced) with the dicing blade DB into chips each having a desirable size. This produces a chip-shaped precursor 108 of the chip thermistor 1 whose substrate 102 and foundation electrode layer 104 serve as the thermistor element body 10 and foundation electrode layer 14, respectively (see (d) of FIG. 4). That is, in the chip-shaped precursor 108, the foundation electrode layers 14 are arranged on the end faces 10e, 10f of the thermistor element body 10, respectively.

Next, the chip-shaped precursor 108 is barrel-polished. This makes the width of the foundation electrode layer 14 in a direction intersecting the opposing direction of the end faces 10e, 10f narrower with distance from the thermistor element body 10. That is, barrel-polishing the chip-shaped precursor 108 shapes the foundation electrode layer 14 into a truncated quadrangular prism.

Next, the plating film 16 having a predetermined thickness is formed on the foundation electrode layer 14 so as to cover the latter. This completes the chip thermistor 1 (see (e) of FIG. 4).

Figure 5:
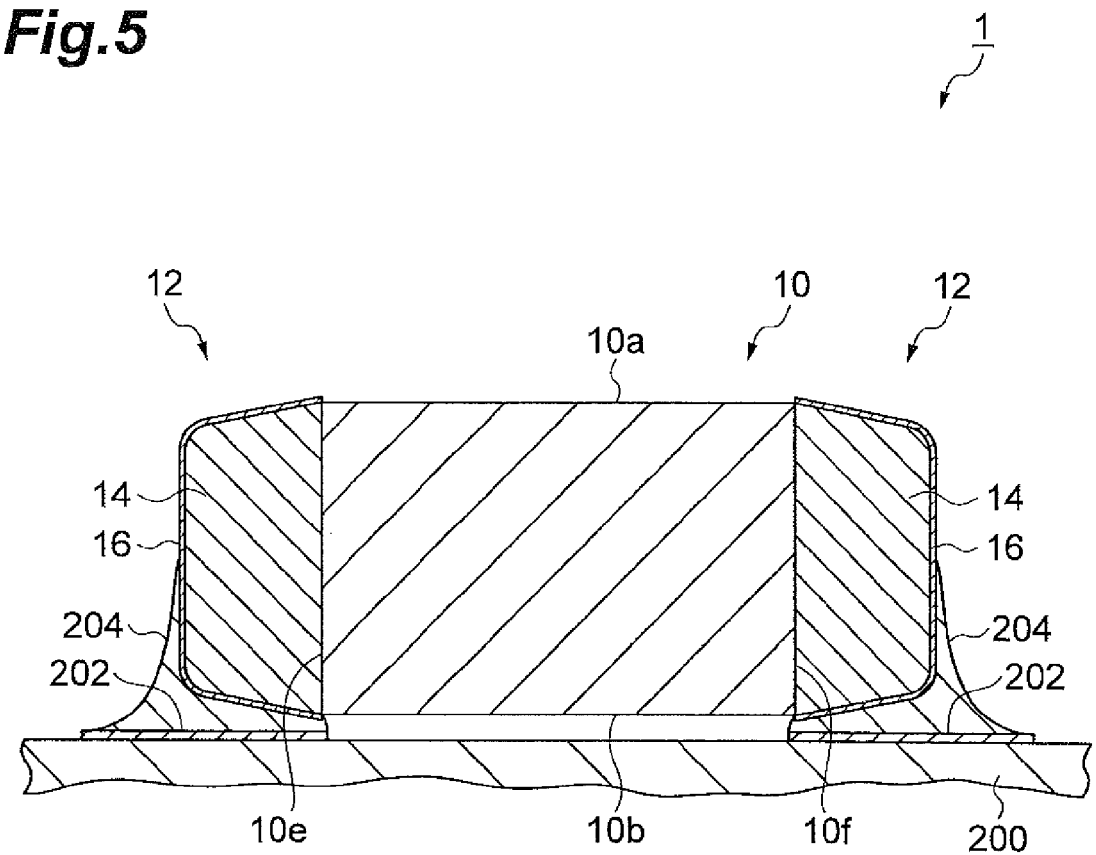
FIG. 5 is a diagram illustrating how the chip thermistor in accordance with the embodiment of the present invention is mounted on a circuit board.

In the outer electrode 12 in the embodiment as constructed in the foregoing, the width in a direction intersecting the opposing direction of the pair of end faces 10e, 10f of the outer electrode 12 is made narrower with distance from the thermistor element body 10. Therefore, when the chip thermistor 1 is mounted on a subject to be measured (e.g., a circuit board 200 illustrated in FIG. 5) such that the main face 10a or 10b opposes the subject, the circuit board 200 and the main face 10a or 10b (thermistor element body 10) come very close to each other. Hence, when soldering an electrode 202 of the circuit board 200 and the outer electrode 12 of the chip thermistor 1 to each other, solder 204 is less likely to go around to the main face 10a or 10b (thermistor element body 10). As a result, the distance between the outer electrodes 12 is hard to change substantially, whereby the chip thermistor 1 is less likely to change its characteristics even after being mounted to the circuit board 12. In addition, the circuit board 200 and the main face 10a or 10b (thermistor element body 10) come very close to each other, so that the temperature of the circuit board 200 can be measured more accurately.

The following problem may occur when the structure of outer electrodes in the multilayer capacitor disclosed in Patent Literature 1 is employed in the chip thermistor. When soldering the chip thermistor to an electrode on a circuit board, solder may go around an outer electrode and adhere to the thermistor element body. If the solder adheres to the thermistor element body, the connection strength between the chip thermistor and the subject to be measured may become insufficient. When soldering the electrode 202 of the circuit board 200 and the outer electrode 12 of the chip thermistor 1 to each other in this embodiment, by contrast, the solder 204 is less likely to go around to the main face 10a, 10b (thermistor element body 10). Therefore, when soldering the chip thermistor 1 to the circuit board 200, the strength between the chip thermistor 1 and the circuit board 200 can be improved.

The foundation electrode layer 14 is porous in this embodiment. Therefore, the foundation electrode layer 14 has a rough surface. This makes it easy for the plating film 16 arranged on the foundation electrode layer 14 to adhere firmly to the foundation electrode layer 14. Hence, heat is conducted efficiently between the foundation electrode layer 14 and the plating film 16. This can improve the accuracy in temperature measurement by the chip thermistor 1.

The foundation electrode layer 14 is porous in this embodiment. Therefore, the foundation electrode layer 14 has a large surface area. Hence, electric fields are likely to concentrate on the foundation electrode layer 14 in the subsequent process of forming the plating film 16, whereby the plating film 16 is easy to adhere to the foundation electrode layer 14. This can shorten the time required for forming the plating film 16. As a result, the plating solution affects the thermistor element body 10 less, while the time required for completing the chip thermistor 1 can be shortened.

The foundation electrode layer 104 is porous in this embodiment. Therefore, when dividing the planar precursor 106 into chips with the dicing blade DB, the contact area between the dicing blade DB and the foundation electrode layer 104 becomes smaller. This can inhibit the foundation electrode layer 104 from deforming at the time of dicing.

The present invention is not limited to the embodiment explained in detail in the foregoing. For example, while the foundation electrode layer 104 is formed by applying a conductive paste onto the main face of the substrate 102 by printing in the embodiment, the conductive paste may be applied onto a film so as to produce a green sheet, and a plurality of such green sheets may be stacked and sintered, so as to form the foundation electrode layer 104.

While the foundation electrode layer 14 is shaped into a truncated quadrangular prism by barrel-polishing the chip-shaped precursor 108, various other methods may be used for shaping the foundation electrode layer 14 into the truncated quadrangular prism. For example, in the dicing process, a wedge-like (triangular) cutout may be formed in the foundation electrode layer 104, and then the planar precursor 106 may be diced along the cutout with the dicing blade DB having a width smaller than that of the cutout.

From the invention thus described, it will be obvious that the embodiments may be varied in many ways. Such variations are not to be regarded as a departure from the spirit and scope of the invention, and all such modifications as would be obvious to one skilled in the art are intended for inclusion within the scope of the following claims.

What is claimed is:

1. A chip thermistor comprising:
a thermistor element body having a pair of end faces opposing each other and a main face connecting the end faces to each other; and
a pair of outer electrodes arranged respectively on the pair of end faces,
wherein each of the pair of outer electrodes is formed into a truncated quadrangular pyramid and has a width in a direction intersecting the opposing direction of the pair of end faces made narrower with distance from the thermistor element body;
wherein each of the pair of outer electrodes has a foundation electrode layer arranged on a respective one of the end faces and a plating film covering the foundation electrode layer; and
wherein each foundation electrode layer is formed into a truncated quadrangular pyramid and has a width in the direction intersecting the opposing direction not greater than that of the respective one of the end faces and made narrower with distance from the thermistor element body.

2. The chip thermistor according to claim 1, wherein each foundation electrode layer is porous.

3. The chip thermistor according to claim 2, wherein each foundation electrode layer has a porosity of 10% to 80%.

4. The chip thermistor according to claim 1,
wherein the plating films are formed directly on the respective foundation electrode layers.

* * * * *